R. E. BAKER, E. H. FORD, AND A. F. CUMMINS.
MACHINE FOR PROVING DOUGH.
APPLICATION FILED MAR. 21, 1917.
1,412,444.
Patented Apr. 11, 1922.
6 SHEETS—SHEET 5.
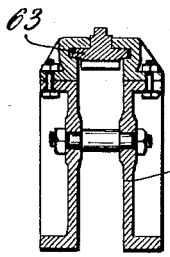
Fig. 14.
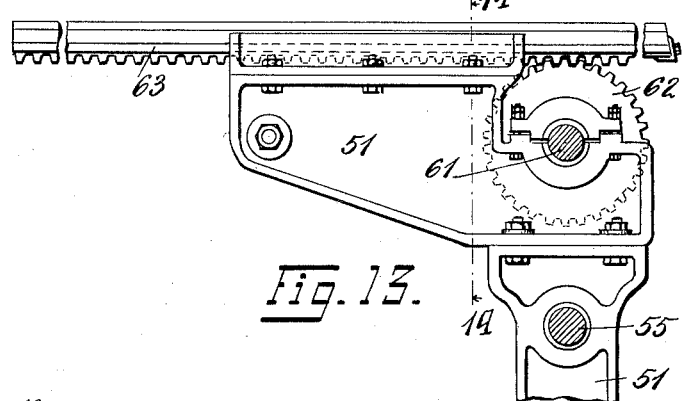
Fig. 13.
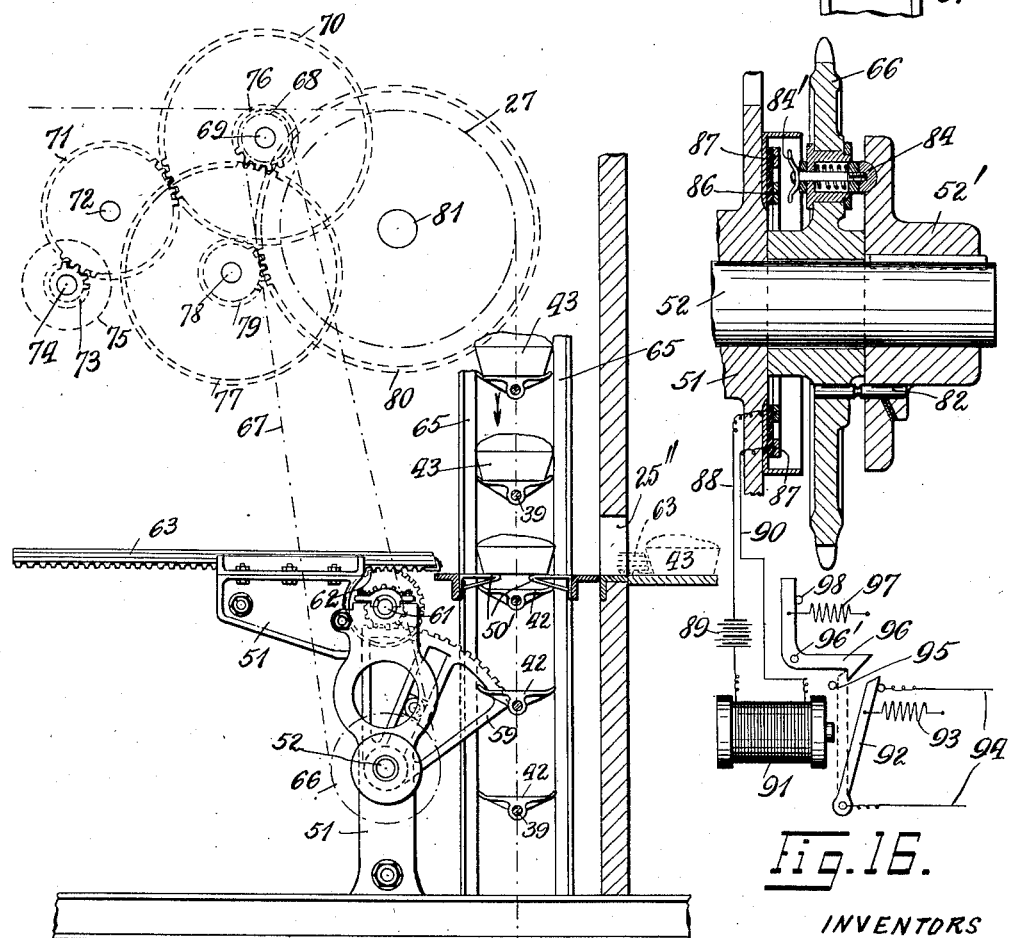
Fig. 12.
Fig. 16.
WITNESS:
Charles A. Mathé.
INVENTORS
Robert Elmer Baker
Eardley Harry Ford
Arthur Francis Cummins
by John Lotka
ATTORNEY.

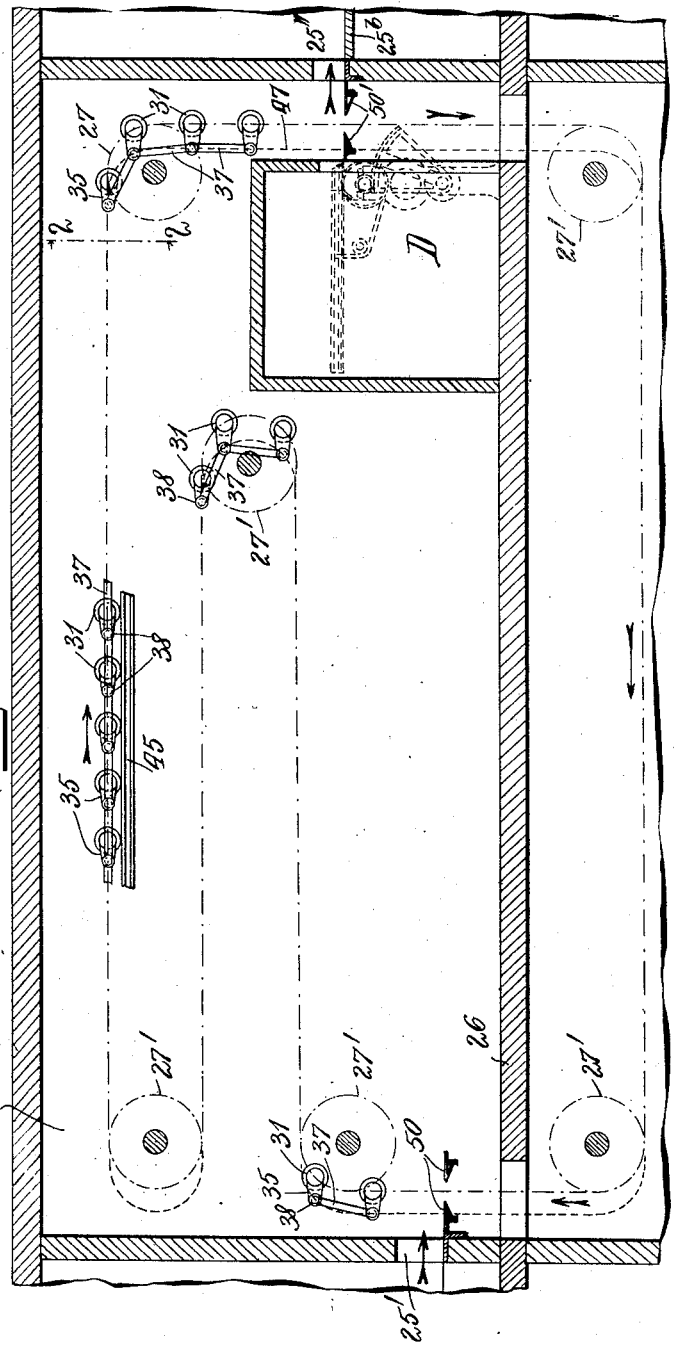

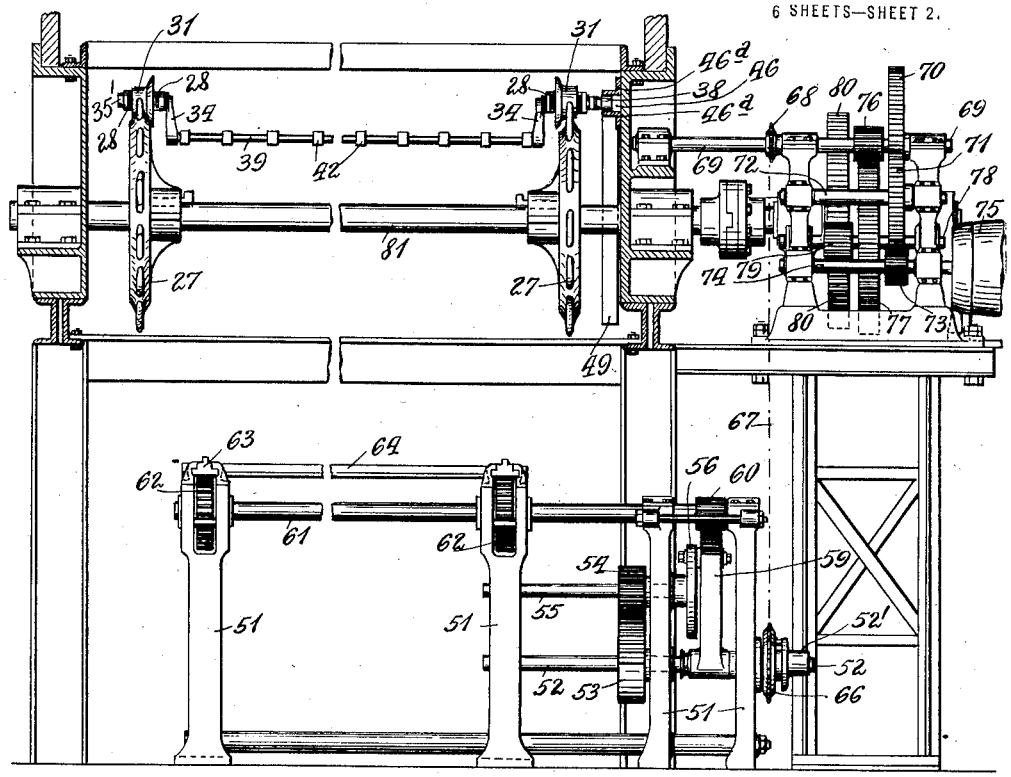
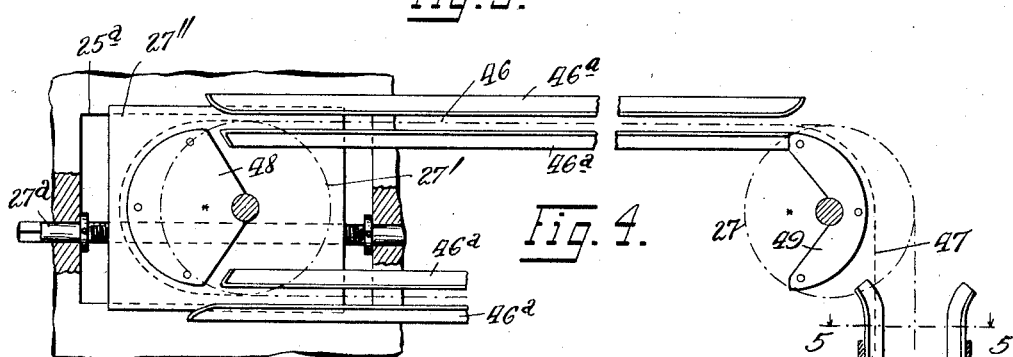
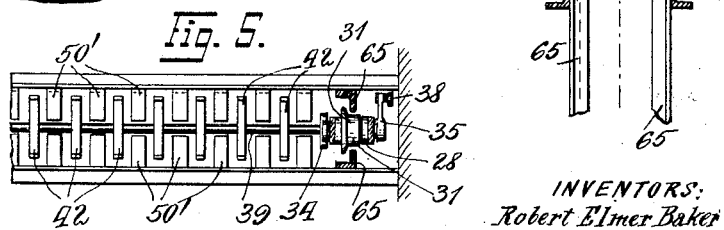

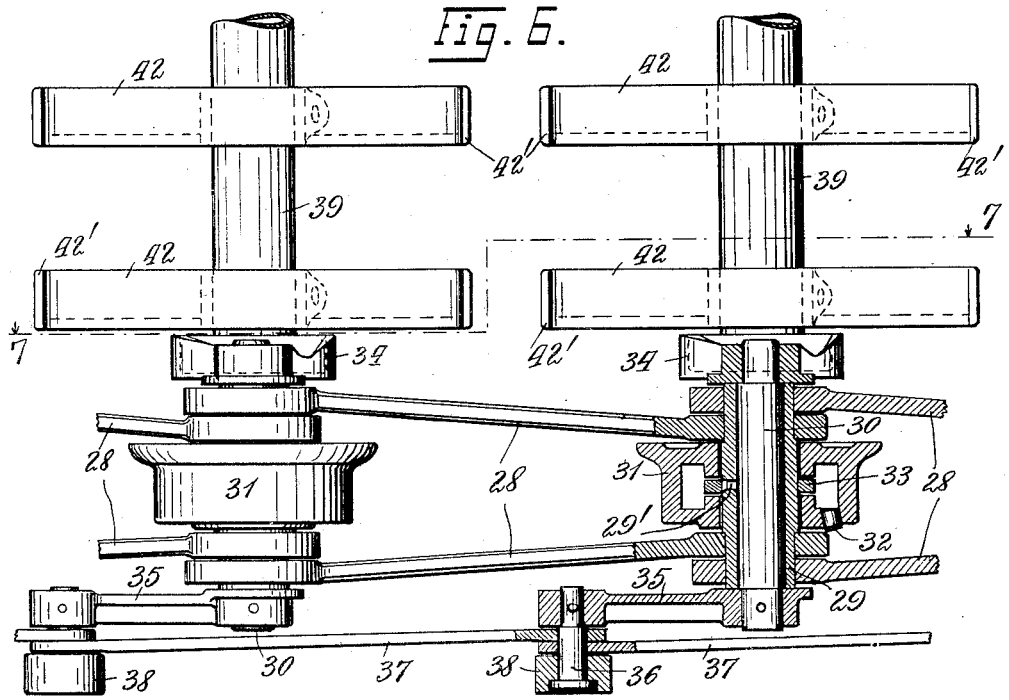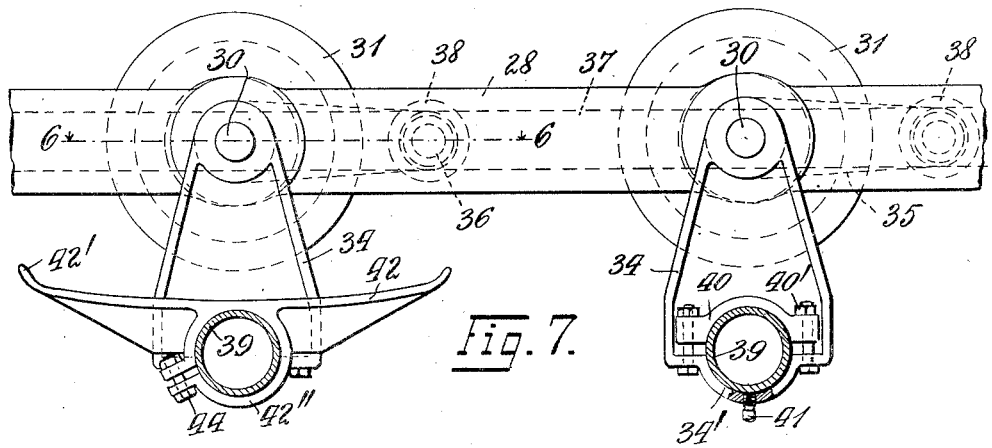

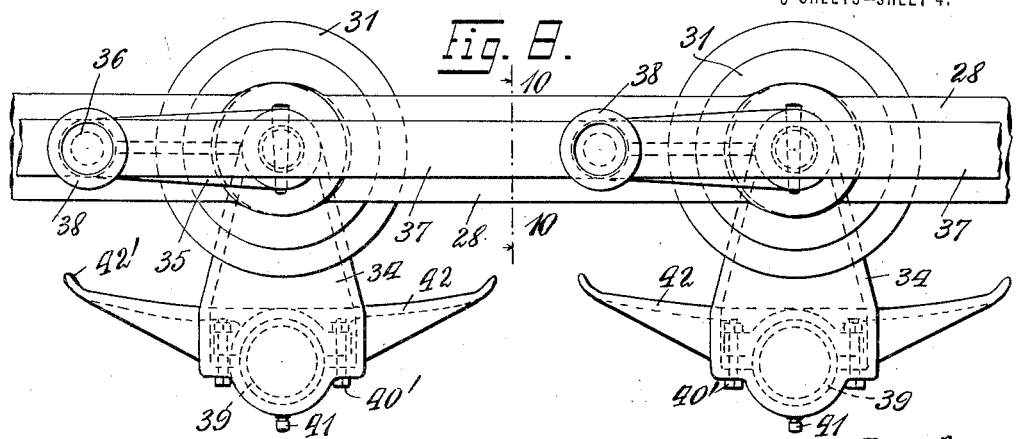

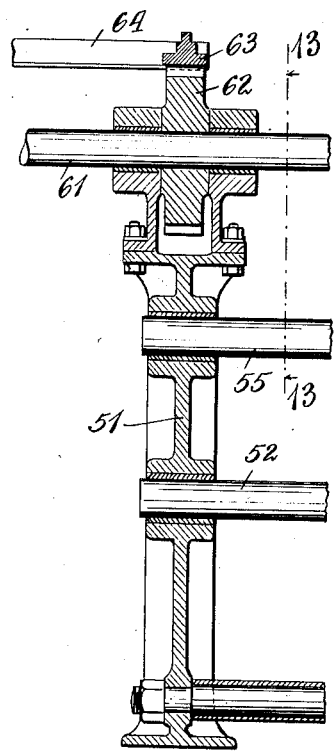
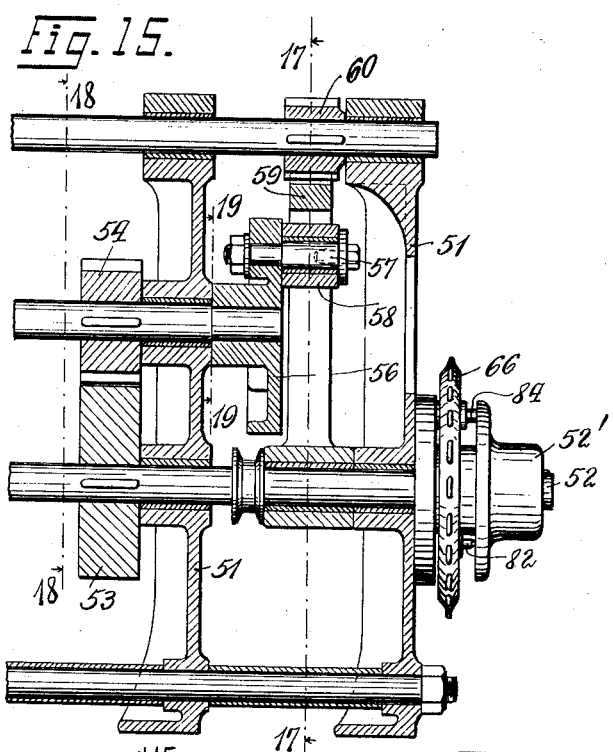
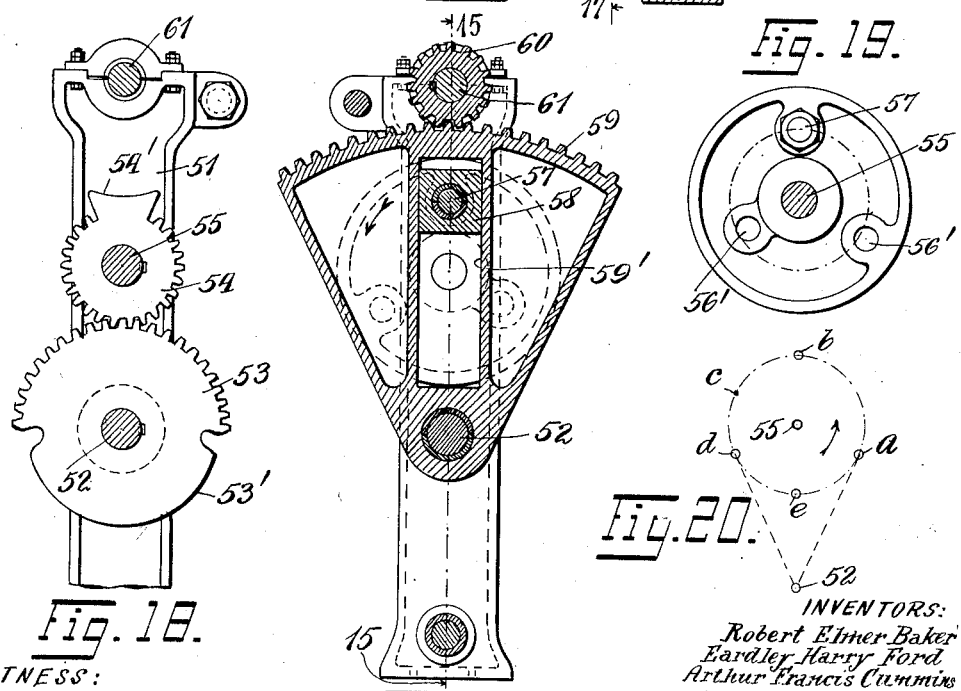

UNITED STATES PATENT OFFICE.

ROBERT ELMER BAKER, OF BRONXVILLE, NEW YORK, EARDLEY HARRY FORD, OF BROOKLYN, NEW YORK, AND ARTHUR FRANCIS CUMMINS, OF NUTLEY, NEW JERSEY, ASSIGNORS, BY MESNE ASSIGNMENTS, TO JOSEPH BAKER SONS & PERKINS COMPANY, INC., OF WHITE PLAINS, NEW YORK, A CORPORATION OF NEW YORK.

MACHINE FOR PROVING DOUGH.

1,412,444. Specification of Letters Patent. Patented Apr. 11, 1922.

Application filed March 21, 1917. Serial No. 156,275.

*To all whom it may concern:*

Be it known that we, ROBERT ELMER BAKER, EARDLEY HARRY FORD, and ARTHUR FRANCIS CUMMINS, all subjects of the King of Great Britain, and residents, respectively, of Bronxville, in the county of Westchester and State of New York, of Brooklyn, in the county of Kings and State of New York, and of Nutley, in the county of Essex and State of New Jersey, have jointly invented certain new and useful Improvements in Machines for Proving Dough, of which the following is a specification.

Our invention relates to machines for proving dough, preparatory to baking, and has for its object to provide an improved conveying and discharging mechanism whereby the dough under treatment may be "proved" efficiently and with a minimum expenditure of power. In the practical use of conveyors employed hitherto for carrying dough through chambers in which it is subjected to heat for the purpose of "proving" it, such conveyors have always been operated with an intermittent movement, and this means a large expenditure of power at each starting of the conveyor, since the parts connected therewith are of considerable weight. To overcome this drawback, we have constructed the machine in such a manner that a continuous movement of the conveyor becomes practicable, and the mechanism employed for the periodical discharge of the trays, tins, or other containers (with the dough therein) from the conveyor, has been so designed as to operate in a perfectly satisfactory manner in conjunction with the continuously moving conveyor. This discharge device has novel features, particularly in the means for driving it, causing its motion to take place with a speed which at first increases gradually and then decreases gradually, both during its active or working stroke and during its return stroke, the latter taking place in less time than the working stroke. A safety device is preferably employed in connection with the discharge mechanism to insure a stoppage of the entire machine (and particularly of the conveyor) in the event of an obstruction's interfering with the proper operation of the discharge device. Other features of our invention relate to means for properly guiding, and more particularly steadying the runs of the conveyor, so that it will always be in the proper position and will also require less power in its operation, since friction is reduced by the more perfect guiding of the conveyor parts.

Reference is to be had to the accompanying drawings, representing an example of our invention. Fig. 1 is a diagrammatic view, partly in longitudinal section, showing one way of arranging our improved conveyor and discharge device; Fig. 2 is a partial vertical section on line 2—2 of Fig. 1; Fig. 3 is an end elevation of the parts above the floor, with certain elements omitted, for the sake of clearness, and some parts in section substantially on line 2—2 of Fig. 1; Fig. 4 is a detail inside face view (with parts in section) of certain guides used in conjunction with the conveyor; Fig. 5 is a detail horizontal section on line 5—5 of Fig. 4; Fig. 6 is a partial top view of the conveyor, with parts in section on line 6—6 of Fig. 7; Fig. 7 is a vertical section on line 7—7 of Fig. 6; Figs. 8 and 9 are side views of the conveyor and its guide at a horizontal portion and at a vertical portion respectively; Fig. 10 is a vertical section on line 10—10 of Fig. 8; Fig. 11 is an end view of a portion of the conveyor at a vertical run thereof; Fig. 12 is a side elevation, with parts in section, showing chiefly the arrangement of the discharge device and its drive; Fig. 13 is a vertical section of the upper portion of the discharge device, taken on line 13—13 of Fig. 15; Fig. 14 is a detail section on line 14—14 of Fig. 13; Fig. 15 is a vertical section on line 15—15 of Fig. 17; Fig. 16 is a detail sectional view showing upon an enlarged scale, certain parts indicated at the right-hand portion of Fig. 15; Fig. 17 is a vertical section on line 17—17 of Fig. 15; Fig. 18 is a partial vertical section on the plane indicated by the line 18—18 in Fig. 15, but showing the parts in a different position; Fig. 19 is a detail vertical section on line 19—19 of Fig. 15; and Fig. 20 is a diagram illustrating the operation of the discharge device.

In Fig. 1, we have indicated at 25 a suitable chamber, heated in any well-known or approved manner, and provided with a floor 26 at one end of which is the entrance opening 25' for the introduction manually or by mechanism of well-known character, of the trays, tins, or other containers in which the dough or other material has been placed. At the other end of the chamber is an outlet 25" through which the said tins or containers are expelled by the discharge device, as more fully set forth hereinafter. To carry these containers from said inlet to the outlet, while exposing the dough or like material to the action of heat for a sufficient length of time, we employ a conveyor of the endless type, arranged within the chamber 25 in any suitable manner. Fig. 1 shows the conveyor as comprising four superposed horizontal runs (two long ones and two short ones) and two vertical runs adjacent to the inlet and to the outlet respectively, but we desire it to be understood that this is an example only, and that various other arrangements might be adopted for the conveyor. The lowermost conveyor run is shown below the floor 26, and the direction of travel, in the example illustrated, is upward at the inlet and downward adjacent to the outlet. As will be set forth in detail hereinafter, the conveyor consists of a pair of endless chains connected by cross-members, said chains passing in engagement with corresponding pairs of wheels or sprockets 27, 27', of which one pair, 27, is driven in the manner described below, the others, 27', being idlers. In Fig. 1, the dotted lines tangential to the circles indicating the sprockets 27, 27', represent the path of the conveyer chains.

Each of the conveyer chains comprises links 28 whose bodies converge as shown in Figs. 6 and 11 while their end portions, which form eyes, are parallel to each other; of course, the eyes at one end are closer together than those at the other end, and those ends of one pair of links which are farthest apart receive between them those ends of the adjacent pair of links which are closest together. The four registering eyes of two adjacent pairs of links are fitted loosely on a sleeve 29 mounted loosely on a pin or axle 30 and provided with shoulders to limit the inward movement or play of the inner link eyes and prevent them from clamping, or binding against, the end faces of a roller 31 mounted to turn on the central portion of the sleeve 29. For the purpose of lubrication, the rollers 31 are preferably made hollow, with an oiling hole normally closed by a plug 32, a washer 33 of felt or other suitable absorbent material being preferably set in a suitable annular recess or opening on the inner surface of the roller, to retain a certain amount of lubricant and feed it to the adjacent outer surface of the sleeve 29, and also, through an opening 29' in said sleeve, to the contacting surfaces of the sleeve 29 and axle 30. On the reduced inner end of each axle 30 (on both chains) is secured rigidly a depending bracket or hanger 34, and on the reduced outer ends of each axle 30 of one of the chains (and not of the other chain) is secured a crank 35. On the chain having no cranks, collars 35' are placed on the other ends of the axles. The cranks 35 attached to the one conveyor chain are horizontal (see particularly Figs. 8 and 9). These cranks are provided at their free ends with crank pins 36, fitted pivotally into eyes at the ends of light links 37 which connect neighboring cranks, and on these crank pins are also mounted loosely, small rollers 38. The links 37 converge and overlap in practically the same manner as the links 28. As will be seen from Figs. 1, 6, 7 and 8, on the horizontal runs of the conveyor, the centers or axes of the crank pins 36 will lie in the same (horizontal) plane with centers or axes of the axles 30. On the vertical runs, the light links 37 connecting adjacent crank pins 36 serve to maintain the horizontal position of the cranks, as will be hereinafter set forth.

The brackets 34 are formed at their free ends with sockets or seats 34' to support the ends of cross-members or tubular rods 39, it being understood that all the brackets 34 of both conveyor chains extend in the same direction, vertically downward from their axles 30. To hold the ends of the rods 39 in position, we have shown clamp members 40 engaging the rod ends from above and located within the lower portions of the brackets, said clamp members being drawn against the rods 39 by means of bolts and nuts 40 or equivalent devices. Set screws 41 are preferably used in addition to the clamping means 40, 40' (see Fig. 7).

On the rods 39 are secured rigidly at suitable intervals, as indicated in Figs. 2, 3, 5, and 6, carriers 42 adapted to receive the tins, trays, or other receptacles 43 (see Fig. 12) containing the dough or other material to be "proved." These carriers have raised ends or hooks 42' to form stops for the tins and are made with split sockets 42" and means, such as bolts and nuts 44, for contracting said sockets and clamping them against the rods 39 so that the carriers 42 will be rigidly connected with said rods, which in turn are rigidly connected with the brackets 34, connected rigidly with the axles 30 and through the axles on one side of the conveyor, also rigidly with the cranks 35 on the one conveyor chain. The two conveyor chains are, of course, so arranged that the axles 30 and brackets 34 of one chain will align with those of the other chain, the rods 39 being parallel to the said axles 30.

In order to guide the conveyor chains in such a manner that the cranks 35 will always retain the same (horizontal) position, and to properly support and steady the conveyor, we have provided the following arrangements: The main rollers 31, which are concentric with the axles 30, are adapted to engage the sprockets 27, 27' suitably formed for this purpose (Fig. 3) and are also adapted to engage guide rails 45 (Fig. 2) located along the horizontal conveyor runs, in such a position as to properly engage and guide the rollers 31 on their path from one sprocket to another sprocket located at the same level; that is to say, as shown in Fig. 2, the top of the guide rail 45 will be at a distance below the axis of the roller 31 when on said run, such distance being practically equal to the radius of the roller. The small rollers 38 at the ends of the cranks 35 are also guided, and in the following manner: There is a guide channel 46 (Figs. 2, 3 and 4) provided adjacent to each of the horizontal runs and the guide rollers 38 travel in these channels which are set so as to keep the cranks 35 in a horizontal position. That is to say, the horizonal axes of the guide rollers 38 and of the main rollers 31 are in the same horizontal plane, but the axis of a guide roller 38 is in advance of or behind the axis of the corresponding main roller 31 by a distance (measured horizontally) equal to the center to center length of guide crank 35. The guide channels 46 may be formed between the opposite faces of parallel ribs 46ª secured to one of the inner walls of the chamber 25. Like the guide rails 45, the guide channels 46 terminate adjacent to the sprockets 27, 27'. The dotted vertical lines 47 in Figs. 1 and 4 indicate the path of the centers of the rollers 38 adjacent to the vertical runs of the conveyor. These vertical path portions 47 lie to one side of the corresponding portions of the path of the rollers 31, at a distance therefrom (measured horizontally) equal to the length of the crank 35.

To maintain the horizontal position of the cranks 35 and thus the horizontal level of the carriers 42 holding the tins or other containers 43, while the main rollers 31 are passing around sprockets 27, 27', we have provided, adjacent to the sprockets, guide discs 48, 49 for the small rollers 38, as shown in Fig. 4. The centers of the sprockets and of the disc peripheries lie in the same horizontal plane but are spaced apart (horizontally) a distance equal to the length of the cranks 35. The pitch diameters of the sprockets and discs are equal, but the discs have no teeth to receive the guide rollers and do not revolve. The diameter of any one of these discs at its rolling surface is therefore that of the root diameter of an equvalent sprocket, that is, the pitch diameter less the diameter of the guide roller 38.

The discs 48, 49 are mounted rigidly upon the frame-work of the machine, except where (as at the left of Fig. 4) a sprocket 27' is journaled in a slide 27" adjustable lengthwise (horizontally) upon guideways 25ª of the wall or frame-work of the chamber 25, for the purpose of taking up slack in the conveyor. In this case, the disc or plate 48 is secured to the said slide 27" and shares its adjustment, which may be effected in any suitable manner (as by means of a screw spindle 27ª), the relative position of the axes of the sprockets and discs being thus maintained the same for all positions of the slide 27". The form 48 of the guide disc is preferred where two horizontal runs of the conveyor are to be connected, and the form 49 for connecting a horizontal run with a vertical one.

Fig. 1 shows at different points the main rollers 31 with corresponding positions of the cranks 35 and rollers 38 and demonstrates clearly how on the horizontal runs having guide channels 46 the rollers 38 hold the conveyor perfectly steady and how the guide chain links 37 maintain the relative positions of the guide rollers while passing around the discs 48, 49, and up or down vertical runs. The tins, trays, or other containers are introduced into the proving chamber manually or by any approved mechanical device that will position them accurately upon the fixed fingers or supports 50 which are so spaced as to clear the rods 39. The carriers 42 mounted on the said rods and brought by the conveyor chains vertically up beneath the tins now in position on the fixed supports 50 lift the tins 43 from the fixed supports 50 which are then ready to receive another set of tins from the feeding device.

The continuous motion of the conveyor will carry the dough or other like material slowly through the proving chamber 25, and when the tins 43 come opposite the discharge opening 25", the carriers 42 mounted on the rods 39 pass downwards between suitable fixed supporting fingers 50' (Fig. 5), leaving the tins upon said fixed fingers, ready for discharge. While we have not shown the arrangement of the fingers 50 in detail, it will be understood that it corresponds exactly to that of the fingers 50', that is to say, in each case there are two sets of fingers, the space between the two sets being sufficient to let the rods 39 pass freely, while the space between adjacent fingers of the same set is of such width and location as to admit of the free passage of the carriers 42, as will be clear from Fig. 5.

For pushing the tins from the proving conveyor on to the table 25ᵇ or onto a conveying belt (not shown) from which they pass into a baking oven, we have provided the discharge device indicated at D in Fig. 1 and constructed as follows (Figs. 12 to 19):

Upon a suitable frame or standards 51 are provided bearings for a main shaft 52, driven as will be described below. On this shaft is secured rigidly a gear 53 in mesh with a pinion 54 rigidly secured to a counter-shaft 55 likewise journaled in said frame. On the counter-shaft 55 is further secured rigidly a disc 56 from which projects a crank pin 57. Preferably, as shown, the disc is provided with three sockets 56', at different distances from the center of the counter-shaft 55, so that the degree of eccentricity of the crank pin 57 may be varied by securing it in one of these sockets or the other. The crank pin 57 extends loosely through a slide 58, movable in and out along a radial guide-way 59' of a toothed sector 59 which is mounted loosely on the main shaft 51, so that it may rock thereon. This sector is in mesh with a pinion 60, mounted rigidly on a shaft 61 which extends across the machine and also carries rigidly two pinions 62 in mesh with racks 63 suitably guided in the frame 51 (see Fig. 14) to slide toward and from the discharge opening 25". These two racks 63 are connected at their forward or outer ends by a cross-bar or pusher 64 whose length and position is such that it may pass between the two chains of the proving conveyor and push the tins 43 from the supporting fingers 50', onto the table 25$^b$. Fig. 12 shows the pusher in its extreme inner or retracted position. The meshing wheels 53, 54 are mutilated gear wheels, so formed that during half a revolution of the shaft 52 the wheel 54 will be driven and perform a full revolution (the radius of the pinion 54 being equal to half the radius of the gear wheel 53), while during the other half-revolution of the wheel 53 the pinion 54 will be held stationary and steady by the engagement of the wheel 53. Notwithstanding the fact that the shaft 52 and therefore the wheel 53 rotate continuously, the peculiar drive described above will produce an intermittent reciprocating movement of the pusher 64, the outward or active movement being relatively slow, and the inward or return movement relatively rapid, although each of these movements or strokes increases in speed gradually from zero to a maximum and then again decreases to zero. This will be understood best by reference to the diagram of Fig. 20, in which the circle indicates the path of the crank pin 57 around the center of the shaft 55, while the two straight lines indicate tangents from the center of the shaft 52 to said circle, at the points $a$ and $d$ respectively. With the proportions shown, the arc $a\ b\ c\ d$ is just twice as long (240°) as the arc $d\ e\ a$ (120°). With the pusher 64 in its retracted position (Fig. 12) and just as the same is about to begin its outward stroke, the crank pin 57 is at the point $a$. The wheels 53, 54 are just beginning to mesh, and the shaft 55 with the crank pin 57 begins to rotate in the direction indicated by the arrow. The right-hand tangent of Fig. 20 may be said to represent the center line of the guide 59' at the beginning of this movement. As the shaft 55 revolves, the pin 57 and the slide 58 cause the sector 59 to rock from right to left as long as the pin 57 is traveling on the arc $a\ b\ c\ d$, and from left to right when the pin is traveling along the arc $d\ e\ a$. The swinging of the sector 59 from right to left corresponds to the working stroke of the pusher, and the swinging from left to right to the return stroke. It will be obvious that the velocity of the swinging movement of the sector, which was zero at the start (point $a$) increases gradually until it attains a maximum at the point $b$ located on the diameter passing through the centers of both shafts 52 and 55. Then the velocity again decreases gradually from said point $b$ (position of parts as shown in Figs. 15, 17, and 19) along the arc $b\ e\ d$ until it again becomes zero at the latter point. (The point $e$, diametrically opposite to the starting point $a$, indicates the position of the crank pin 57 at the time the relative position of the gear wheels 53, 54 is as shown in Fig. 18). The sector 59 then swings in the opposite direction, from left to right, while the crank pin 57 travels along the arc $d\ e\ a$, the speed of the swinging movement (and therefore, of the sliding movement of the pusher 64) being zero at $d$ and increasing gradually to the central point $e$, to then again decrease gradually to the point $a$, where the velocity of the sector and of the pusher again become zero. While the movement of the crank pin 57 is continuous, and at a uniform rate of speed, throughout the complete revolution above described, along the path $a\ b\ c\ d\ e\ a$, the crank pin 57 comes to a rest when it reaches the point $a$ at the end of such revolution, and remains at rest during an interval of time equal to that taken for said revolution. While the crank pin is at rest (and with it the sector 59 and the pusher 64), the rotating surface 53' slides along the stationary concave surface 54', thus holding the sector 59 and the pusher against accidental movement. It will be understood that, since the crank pin 57 at the time of its movement rotates at a uniform rate of speed, the time taken for the outward or active stroke of the pusher (arc $a\ b\ c\ d$) is considerably more than the time taken for the return stroke (arc $d\ e\ a$), the return stroke, in the example shown, taking just half the time that is required for the operative stroke of the pusher. It will be evident that the maximum speed reached during the working stroke (point $b$) is considerably less than the maximum speed reached during the return stroke (point $e$), the speed at $b$ being less than half the speed at *e*. As a result, we obtain, during one complete revolution of the main shaft 52, the following operation: During the first half of said revolution, the shaft 55 will be driven, performing a complete revolution during this time. During the major part of this revolution of the shaft 55 (⅔ of a revolution of the shaft 55, corresponding to ⅓ of a revolution of the main shaft), the sector 59 and the pusher 64 will be given their working stroke, at a speed increasing gradually from zero to a maximum, and then decreasing again to zero. During the remaining smaller part of the revolution of the shaft 55 (⅓ of a revolution in the example shown, corresponding to ⅙ of a revolution of the main shaft), a return movement will be imparted to the sector 59 and pusher 64, such return movement increasing gradually in speed from zero to a maximum greater than the maximum speed of the working stroke, and then again gradually decreasing to zero. It will be obvious that since the return movement takes place in a much shorter time than the working stroke, the velocity (that is, the average velocity) during the return stroke is much greater than that during the working stroke, enabling the machine to be operated more efficiently. It is not practicable to operate the pusher at a relatively high speed during the working stroke, owing to the danger of injuring the dough, or of upsetting the tins on the table 25ᵇ. During the second half of the revolution of the main shaft 52, the shaft 55 and the pusher will remain at rest.

Of course the movements of the pusher and of the proving conveyor will be so timed that between two successive working strokes of the pusher the conveyor will advance a distance equal to the length of the chain links. In order to prevent any swaying of the conveyor portion at which the pusher operates, we may provide two spaced guides 65 (Figs. 4, 5 and 12) extending along the vertical conveyor run from the sprocket 27 to the sprocket below, on each of the opposite walls of the proving chamber 25, said guides being so placed as to be engaged by the rollers 31, which would pass between them. As shown, the rollers are provided with flanges 31′, fitting the rails 45 in the same manner as the flanges of the wheels of railroad cars, so as to prevent any motion of the conveyor chains laterally, or transversely of their plane. These flanges might also engage the guides 65 in a similar manner, and for the same purpose. Figs. 5 and 12 show that the adjacent or inner ends of the supporting fingers 50′ are relatively close together, so as to provide an almost continuous support for the tin 43 or other article to be removed, leaving a narrow space sufficient for the passage of the rod 39; the guides 65 however are placed at a relatively considerable distance from each other, and from the path of the chain pivots, thus affording a much more efficient bracing action, in conjunction with the rollers 31, than if said guides were close to such path.

The conveyor and the main shaft 52 may be driven as follows (Figs. 3 and 12): A sprocket 66, normally rigid with the main shaft 52, is connected by a chain 67 with a smaller sprocket 68 on a shaft 69 which carries a gear wheel 70 in mesh with a pinion 71 on a shaft 72. The pinion 71 is also in engagement with another pinion 73 on the shaft 74, driven in any suitable manner, as by connecting an electric motor 75 with it. The shaft 69 further carries a pinion 76 in mesh with a gear wheel 77 on a shaft 78 which also carries a pinion 79 in mesh with a gear wheel 80 on the shaft 81 carrying the two driving sprockets 27 of the proving conveyor.

As a safety device to prevent serious injury to the mechanism in the event of a jamming of the conveyor owing to tins falling off, or any other cause, we have provided the following arrangement: The sprocket 66, while normally held to turn with the shaft 52, may become free or loose under certain conditions, being connected with a collar 52′, rigid with said shaft, by means of a pin 82 having a weakened portion, so that the pin will be strong enough to transmit the power normally required for the operation of the pusher, but will break if through any cause the resistance to the movement of the pusher becomes abnormal. Thus, should any obstruction become lodged in the path of the pusher, the pin 82 will break, and the drive of the pusher will be arrested, so that the pusher will no longer be pressed against the obstruction, and injury to the pusher and to the conveyor will thus be avoided.

We also consider it advisable that in the event of the breaking of the pin 82, the motive power should be disconnected not only from the pusher but from the proving conveyor as well, thus stopping the latter. For this purpose, as long as the pin 82 is unbroken, a pin 84, mounted to slide in the sprocket 66 in a direction parallel to the shaft 52, is pressed by a coiled spring 85 into a small socket in the collar 52′, so that an elastic contact member 84′ carried by the other end of the pin 84 will be out of engagement with two insulated rings 86, 87, which are stationary. When the pin 82 breaks, the sprocket 66, becoming loose on the shaft 52, will continue to be turned for a while by the chain 67, and this rotation of the sprocket 66 relatively to the collar 52′ (which has become stationary) will force the end of the pin 84 out of its socket and bring the contact member 84′ against the contact rings 86, 87, closing a circuit which may be utilized to shut off the power in any suitable manner. For instance, as indicated diagrammatically in Fig. 16, the one contact 86 may be connected by a wire 88 to one terminal of a source of electricity 89, while the contact 87 is connected by a wire 90 with an electromagnet coil 91 also connected with the other terminal of the source of electricity. The armature 92 of this magnet would normally, under the influence of a spring 93, close the circuit 94 of the electromotor 75, but when attracted by the magnet upon the energizing of the latter, the armature would open said circuit 94 and cause the motor 75 to stop. As the momentum of the conveyor might keep it in motion for a short time, causing the sprocket 66 to revolve for a few revolutions after the pin 82 has become broken, the pin 84 would at each of these revolutions for a moment reach the position shown in Fig. 16 and cause the circuit of the coil 91 to become interrupted. This would tend to allow the armature 92 to swing back to the circuit-closing position indicated by full lines in Fig. 16, so that the motor 75 would receive a short current-impulse, tending to keep the apparatus in motion, in a jerky fashion. To avoid this, we have shown a hook catch 96, pivoted at 96', and normally pulled against a stop 98 by a spring 97. When the armature 92 is attracted against the stop 95, the catch yields to let the armature pass, and then snaps back to lock the armature in the position indicated by dotted lines, so that said armature cannot swing back to the circuit-closing position when the coil 91 is temporarily currentless, as described above. The circuit 94 will therefore remain open after the breaking of the pin 82. When proper repairs have been completed, and a new pin 82 has been substituted for the broken one, the operator would lift the hook end of the catch 96, allowing the armature 92 to resume its circuit-closing position.

Various modifications may be made without departing from the nature of our invention as set forth in the appended claims.

We claim as our invention:

1. In a conveyor mechanism, a conveyor comprising transversely-aligning chains, carriers located between the chains and connected with them pivotally, cranks extended from the carrier pivots and connected with the carriers rigidly, and rigid links each having its opposite ends connected pivotally with the outer ends of consecutively-adjacent cranks.

2. In a conveyor mechanism, a conveyor comprising transversely-aligning chains, carriers located between the chains and connected with them pivotally, cranks extending from the carrier pivots and connected rigidly with the respective carriers, rigid links each having its opposite ends connected pivotally with the outer ends of consecutively-adjacent cranks, and guides for the outer ends of the cranks.

3. In a conveyor mechanism, a conveyor comprising endless transversely-aligning chains, carriers located between the chains and connected with them pivotally, cranks extending from the carrier pivots adjacent to one of said chains and connected with said carriers rigidly, a guide for the outer ends of the cranks, located along a portion of the conveyor's path, and rigid links each having its opposite ends connected pivotally with the outer ends of consecutively-adjacent cranks.

4. In a conveyor mechanism, a longitudinally-movable conveyor, carriers connected pivotally with said conveyor at different points of its length, cranks extending from the carrier pivots and connected rigidly with the respective carriers, and rigid links each having its opposite ends connected pivotally with the outer ends of consecutively-adjacent cranks.

5. In a conveyor mechanism, a longitudinally-movable conveyor, carriers connected pivotally with said conveyor at different points of its length, cranks extending from the carrier pivots and connected rigidly with the respective carriers, rigid links each having its opposite ends connected pivotally with the outer ends of consecutively-adjacent cranks, and guides for the outer ends of the cranks.

6. In a conveyor mechanism, a longitudinally-movable conveyor, carriers connected pivotally with said conveyor at different points of its length, cranks extending from the carrier pivots and connected with the respective carriers, a guide for the outer ends of the cranks, located along a portion of the conveyor's path, and rigid links each having its opposite ends connected pivotally with consecutively-adjacent cranks at a distance from their pivots.

7. In a conveyor mechanism, a conveyor comprising transversely aligning chains, carriers located between said chains and connected with them at the chain pivots, cranks extending from one of the chains at its pivots and connected rigidly with the respective carriers, and rigid links each having its opposite ends connected pivotally with the outer ends of consecutively adjacent cranks.

8. In a conveyor mechanism, a conveyor comprising transversely-aligning chains, carriers located between said chains and connected with them at the chain pivots, cranks extending from one of the chains at its pivots and connected rigidly with the respective carriers, rigid links each having its opposite ends connected pivotally with the outer ends of adjacent cranks, and guides for the outer ends of the cranks.

9. In a conveyor mechanism, a conveyor comprising endless transversely-aligning chains, carriers located between the chains and connected with them at their pivots, cranks extending from one of the chains at its pivots and connected with said carriers, a guide for the outer ends of the cranks, located along a portion of the conveyor's path, and rigid links each having its opposite ends connected pivotally with the outer ends of adjacent cranks.

10. In a conveyor mechanism, a conveyor having a straight run and a curved run adjacent thereto, carriers connected with said conveyor pivotally and provided with crank members, a stationary guide located at the straight conveyor run and adapted for engagement by said crank members, and a curved guide, likewise adapted to be engaged by said crank members, located at the curved conveyor run and adjustable longitudinally of the straight conveyor run.

11. In a conveyor mechanism, a conveyor having a straight run and a curved run adjacent thereto, carriers connected with said conveyor pivotally and provided with crank members, a stationary guide located at the straight conveyor run and adapted for engagement by said crank members, and a slide movable for adjustment longitudinally of the straight conveyor run, and provided with a curved guide located at the curved conveyor run to guide the crank members of the carriers on said curved run.

12. In a conveyor mechanism, a conveyor having a straight run and a curved run adjacent thereto, carriers connected with said conveyor loosely and provided with crank members, a stationary guide located at the straight conveyor run and adapted for engagement by said crank members, a slide movable for adjustment lengthwise with reference to the straight conveyor run, a curved guide carried by said slide and adapted for engagement by said crank members while they are traveling on the curved conveyor run, and a conveyor support journaled on said slide and having its center offset with reference to the center of the curved guide, the line connecting said two centers being parallel to the straight conveyor run.

In testimony whereof we have signed this specification.

ROBERT ELMER BAKER.
EARDLEY HARRY FORD.
ARTHUR FRANCIS CUMMINS.